(12) United States Patent
Sugo

(10) Patent No.: US 12,162,491 B2
(45) Date of Patent: Dec. 10, 2024

(54) BRAKING/DRIVING FORCE CONTROL METHOD AND BRAKING/DRIVING FORCE CONTROL DEVICE

(71) Applicant: Nissan Motor Co., Ltd., Yokohama (JP)

(72) Inventor: Ken Sugo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/563,318

(22) PCT Filed: May 27, 2021

(86) PCT No.: PCT/JP2021/020182
§ 371 (c)(1),
(2) Date: Nov. 21, 2023

(87) PCT Pub. No.: WO2022/249393
PCT Pub. Date: Dec. 1, 2022

(65) Prior Publication Data
US 2024/0262362 A1    Aug. 8, 2024

(51) Int. Cl.
*B60W 10/188* (2012.01)
*B60W 10/08* (2006.01)
(Continued)

(52) U.S. Cl.
CPC ...... *B60W 30/18127* (2013.01); *B60W 10/08* (2013.01); *B60W 10/188* (2013.01);
(Continued)

(58) Field of Classification Search
CPC ........... B60W 30/18127; B60W 10/08; B60W 10/188; B60W 10/192; B60W 30/18181;
(Continued)

(56) References Cited

U.S. PATENT DOCUMENTS 9,963,141 B2    5/2018   Yamamoto et al.
10,137,872 B2   11/2018  Goto
(Continued)

FOREIGN PATENT DOCUMENTS

CN   105283361 A  *  1/2016  ............ B60T 13/146
CN   109130887 A     1/2019
(Continued)

*Primary Examiner* — B M M Hannan
(74) *Attorney, Agent, or Firm* — Young Basile Hanlon & MacFarlane, P.C.

(57) ABSTRACT

A braking/driving force control method includes detecting an accelerator stroke amount being the stroke amount of an accelerator pedal, calculating a driving force to be generated by a vehicle driving force source when the accelerator stroke amount is larger than a predetermined first stroke amount, calculating a deceleration driving force to be generated by the vehicle driving force source when the accelerator stroke amount is smaller than a second stroke amount set to a value smaller than or equal to the first stroke amount, controlling the vehicle driving force source to generate the calculated driving force and deceleration driving force, and generating a braking force on wheels according to a depressing operation of a brake pedal by a driver and controlling a brake stroke amount being the stroke amount of the brake pedal according to the calculated deceleration driving force.

12 Claims, 4 Drawing Sheets

(51) Int. Cl.
*B60W 10/192* (2012.01)
*B60W 30/18* (2012.01)
*F16D 55/226* (2006.01)
*F16D 65/18* (2006.01)

(52) U.S. Cl.
CPC .... *B60W 10/192* (2013.01); *B60W 30/18181* (2013.01); *F16D 55/226* (2013.01); *F16D 65/183* (2013.01); *B60W 2520/10* (2013.01); *B60W 2540/10* (2013.01); *B60W 2540/12* (2013.01); *B60W 2710/08* (2013.01); *B60W 2710/18* (2013.01)

(58) Field of Classification Search
CPC ......... B60W 2520/10; B60W 2540/10; B60W 2540/12; B60W 2710/08; B60W 2710/18; F16D 55/226; F16D 65/183
USPC .......................................................... 701/22
See application file for complete search history.

(56) References Cited

U.S. PATENT DOCUMENTS

| | | | |
|---|---|---|---|
| 10,155,521 B2 | 12/2018 | Takeya et al. | |
| 11,124,174 B2 | 9/2021 | Suzuki | |
| 11,325,582 B2 | 5/2022 | Makino | |
| 11,498,535 B2 | 11/2022 | Suzuki et al. | |
| 2015/0032353 A1* | 1/2015 | Ajiro | B60T 13/662 303/3 |
| 2017/0361851 A1 | 12/2017 | Takeya et al. | |
| 2020/0130673 A1 | 4/2020 | Suzuki | |
| 2020/0339081 A1 | 10/2020 | Suzuki et al. | |
| 2021/0284169 A1* | 9/2021 | Isono | G05G 5/03 |

FOREIGN PATENT DOCUMENTS

| | | |
|---|---|---|
| DE | 112016003027 T5 | 3/2018 |
| DE | 102019128373 A1 | 5/2020 |
| EP | 3121082 B1 | 12/2018 |
| JP | H05-042861 A | 2/1993 |
| JP | H09-095222 A | 4/1997 |
| JP | 2000-205015 A | 7/2000 |
| JP | 4830680 B2 * | 12/2011 |
| JP | 5889664 B2 * | 3/2016 |
| JP | 2016-141232 A | 8/2016 |
| JP | 5978943 B2 * | 8/2016 |
| JP | 2017-087799 A | 5/2017 |
| JP | 2019-126148 A | 7/2019 |
| JP | 2020-059367 A | 4/2020 |
| JP | 2020-067041 A | 4/2020 |
| JP | 2020-100349 A | 7/2020 |

* cited by examiner

BRAKING/DRIVING FORCE CONTROL METHOD AND BRAKING/DRIVING FORCE CONTROL DEVICE

TECHNICAL FIELD

The present invention relates to a braking/driving force control method and a braking/driving force control device.

BACKGROUND

JP 2000-205015 A below describes a vehicle capable of accelerating or decelerating only by operating an accelerator pedal by generating driving force when an operation amount of the accelerator pedal is larger than a predetermined operation amount and by generating deceleration driving force when the operation amount of the accelerator pedal is smaller than the predetermined operation amount.

SUMMARY

The vehicle as described above is provided with a friction brake that generates deceleration according to operation of a brake pedal in order to enable the vehicle to generate deceleration according to the operation of the brake pedal in addition to the deceleration driving force of a vehicle driving force source. When a driver in such a vehicle operates the brake pedal after taking his or her foot off the accelerator pedal, the driver may feel discomfort because deceleration has already been generated before the brake pedal is operated.

It is an object of the present invention to reduce the discomfort of a driver when operating a brake pedal in a braking/driving force control device that generates driving force and deceleration driving force according to an operation amount of an accelerator pedal.

According to an aspect of the present invention, there is provided a braking/driving force control method including: detecting an accelerator stroke amount being a stroke amount of an accelerator pedal; calculating a driving force to be generated by a vehicle driving force source when the accelerator stroke amount is larger than a predetermined first stroke amount, and calculating a deceleration driving force to be generated by the vehicle driving force source when the accelerator stroke amount is smaller than a second stroke amount smaller than or equal to the first stroke amount; controlling the vehicle driving force source to generate the calculated driving force and deceleration driving force; generating a braking force of wheels according to depressing operation of the brake pedal by a driver; and controlling a brake stroke amount being a stroke amount of the brake pedal according to the calculated deceleration driving force.

According to an aspect of the present invention, it is possible to reduce the discomfort of a driver when operating a brake pedal in a braking/driving force control device that generates driving force and deceleration driving force according to an operation amount of an accelerator pedal.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION (Configuration)

Figure 1:
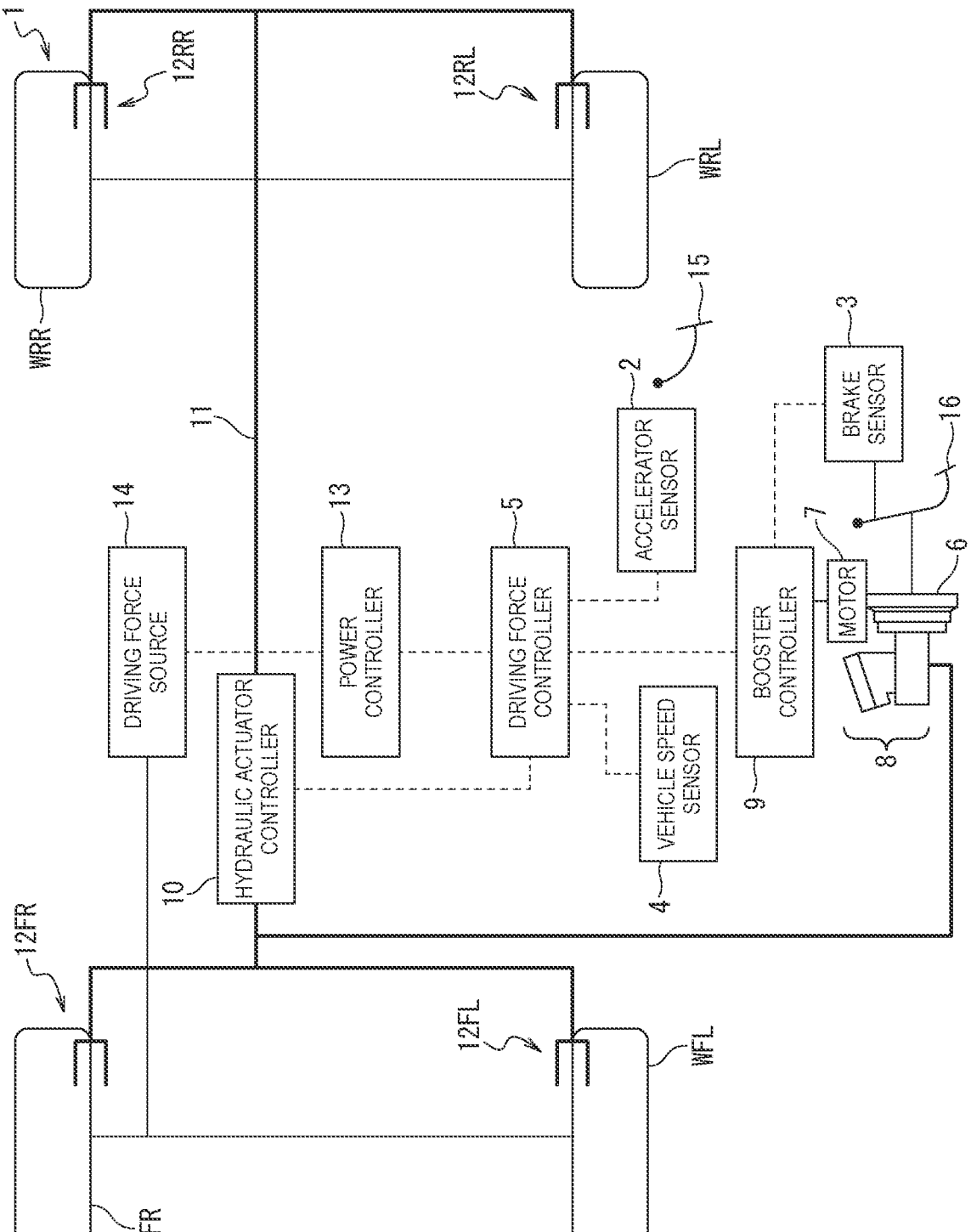
FIG. 1 is a schematic configuration diagram of an example of a vehicle including a braking/driving force control device according to an embodiment.

FIG. 1 is a schematic configuration diagram of an example of a vehicle including a braking/driving force control device of an embodiment. A braking/driving force control device 1 includes an accelerator sensor 2, a brake sensor 3, a vehicle speed sensor 4, a driving force controller 5, a booster 6, an electric motor 7, a master cylinder 8, a booster controller 9, a hydraulic actuator controller 10, and a hydraulic actuator 11. Additionally, the braking/driving force control device 1 includes a right front wheel brake caliper 12FR, a left front wheel brake caliper 12FL, a right rear wheel brake caliper 12RR, and a left rear wheel brake caliper 12RL, respectively, arranged on a right front wheel WFR, a left front wheel WFL, a right rear wheel WRR, and a left rear wheel WRL. These brake calipers 12FR, 12FL, 12RR, and 12RL may be collectively referred to as "brake calipers 12". The braking/driving force control device 1 also includes a power controller 13 and a driving force source 14. Note that hereinafter, the booster controller 9, the booster 6, the master cylinder 8, and the brake calipers 12 are also collectively referred to as a braking device. In addition, the driving force controller 5 and the booster controller 9 are collectively referred to as a controller for controlling braking/driving force of the vehicle.

The accelerator sensor 2 detects an accelerator stroke amount Sa that is a stroke amount (depression amount) of an accelerator pedal 15 that can be operated by a driver. The accelerator pedal 15 is a pedal that the driver depresses according to a braking force requirement (the driver's own intention to brake) or a driving force requirement (the driver's own intention to drive). The accelerator sensor 2 outputs an information signal of the accelerator stroke amount Sa to the driving force controller 5.

The brake sensor 3 detects a brake stroke amount Sb that is a stroke amount (depression amount) of the brake pedal 16 that can be operated by the driver. The brake pedal 16 is a pedal that the driver depresses according to only a braking force requirement, and is provided separately from the accelerator pedal 15. The brake sensor 3 outputs an information signal of the brake stroke amount Sb to the booster controller 9.

The vehicle speed sensor 4 detects vehicle speed of the vehicle from a rotational speed of a driving motor or engine that is the driving force source 14, rotational speeds (wheel speeds) of the wheels WFR, WFL, WRR, and WRL, and the like. The vehicle speed sensor 4 outputs an information signal of the vehicle speed to the driving force controller 5.

The driving force controller 5 is an electronic control unit (ECU) that controls braking force and driving force to be generated in the vehicle on the basis of the accelerator stroke amount Sa, and includes a processor and peripheral components such as a storage device. Functions of the driving force controller 5 described below are realized by causing the processor to execute a computer program stored in the storage device. The driving force controller 5 may be formed by dedicated hardware. For example, the driving force controller 5 may include a functional logic circuit (e.g. FPGA, ASIC, or the like) set in a general-purpose semiconductor integrated circuit.

The driving force controller 5 uses various input information signals to output command signals (a deceleration torque command signal and an acceleration torque command signal) for controlling the booster 6, the hydraulic actuator 11, and the driving force source 14. A specific configuration of the driving force controller 5 is described later.

The deceleration torque command signal is an information signal of a braking force command value for controlling the braking force to be generated in the vehicle on the basis of the accelerator stroke amount Sa. The deceleration torque command signal includes at least one of a frictional braking torque command value that is a command value for controlling hydraulic pressure of each brake caliper 12 or a regenerative braking torque command value generated by a motor (electric motor) included in the driving force source 14. A regenerative braking torque (negative driving torque) generated by the motor included in the driving force source 14 is an example of "a deceleration driving force" described in the claims. The deceleration torque command signal is calculated by the driving force controller 5 according to a braking force requirement or the like by the driver.

The acceleration torque command signal is an information signal of a driving force command value for controlling the driving force generated by the driving force source 14. The acceleration torque command signal is calculated by the driving force controller 5 according to a driving force requirement or the like by the driver.

The booster 6 is an electric boosting device that uses force generated by the electric motor 7 to assist a pedal depression force when the driver depresses the brake pedal 16.

The booster controller 9 is an electric control unit that controls the electric motor 7 of the booster 6, and includes a processor and peripheral components such as a storage device. Functions of the booster controller 9 described below are realized by causing the processor to execute a computer program stored in the storage device. The booster controller 9 may be formed by dedicated hardware.

The booster controller 9 drives the electric motor 7 on the basis of the deceleration torque command signal (frictional braking torque command value) output by the driving force controller 5 and a detection value of the brake sensor 3 to control the brake stroke amount Sb.

The master cylinder 8 converts the pedal depression force applied to a hydraulic piston and an assist thrust by the booster 6 into master cylinder pressure when the brake pedal 16 is depressed.

The hydraulic actuator 11 is interposed between the master cylinder 8 and the brake calipers 12 to control brake hydraulic pressure (wheel cylinder pressure) on the brake calipers 12.

Figure 2:
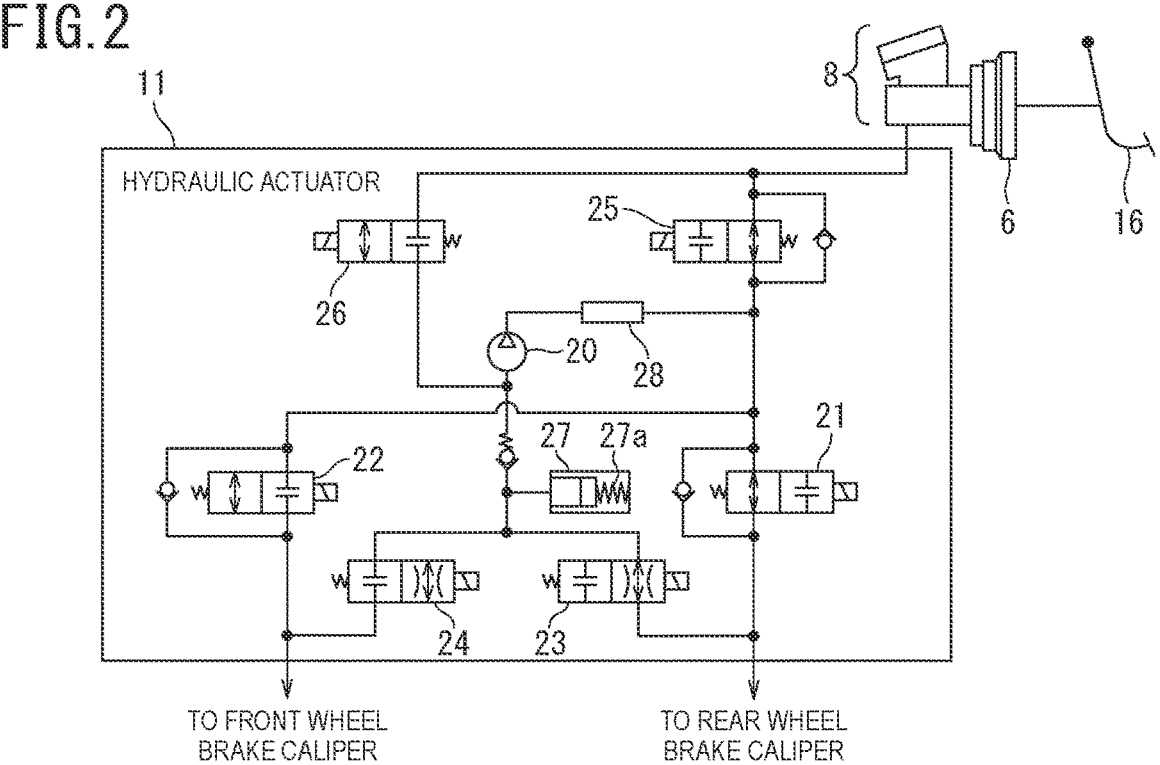
FIG. 2 is a schematic configuration diagram of an example of a hydraulic actuator.

FIG. 2 is a schematic configuration diagram of an example of the hydraulic actuator 11. The hydraulic actuator 11 includes a hydraulic pump 20, a rear wheel in-valve 21, a front wheel in-valve 22, a rear wheel out-valve 23, a front wheel out-valve 24, a cut valve 25, a suction valve 26, a reservoir tank 27, and a damper 28. The hydraulic actuator 11 includes two systems using a hydraulic circuit illustrated in FIG. 2. One system controls brake hydraulic pressure on the right front wheel brake caliper 12FR and the left rear wheel brake caliper 12RL, and the other system controls brake hydraulic pressure on the left front wheel brake caliper 12FL and the right rear wheel brake caliper 12RR.

The hydraulic pump 20 is controlled by a drive command output from the hydraulic actuator controller 10 to send brake fluid stored in the reservoir tank 27 to the master cylinder 8 and the brake calipers 12. The rear wheel in-valve 21 and the front wheel in-valve 22 switch the hydraulic path to a pressure increasing or holding path by a solenoid command output from the hydraulic actuator controller 10. The rear wheel out-valve 23 and the front wheel out-valve 24 switch the hydraulic path to a pressure increasing, holding, or reducing path by a solenoid command output from the hydraulic actuator controller 10.

The cut valve 25 shuts off a normal braking path from the master cylinder 8 when a vehicle dynamics control (VDC) function is activated. The suction valve 26 opens a path from the master cylinder 8 to the hydraulic pump 20 when the VDC function is activated.

The reservoir tank 27 temporarily stores the brake fluid drained from the brake caliper 12 of each wheel during depressurization. The reservoir tank 27 is provided with a pressurizer 27a that applies a predetermined pressure to the brake fluid inside the reservoir tank 27. The pressurizer 27a prevents the brake fluid from remaining in the reservoir tank 27 when the hydraulic pump 20 sucks out the brake fluid inside the reservoir tank 27. The pressurizer 27a may include, for example, a piston slidably fitted in the reservoir tank 27 and a biasing member that biases the piston toward a brake fluid inlet/outlet of the reservoir tank 27. The biasing member may be an elastic body such as a spring.

The damper 28 suppresses pulsation of the brake fluid when the VDC function and an anti-lock brake system (ABS) function are activated.

Refer to FIG. 1. The hydraulic actuator controller 10 is an electronic control unit that controls the hydraulic pump 20 of the hydraulic actuator 11 and the respective valves 21 to 26, and includes a processor and peripheral components such as a storage device. Functions of the hydraulic actuator controller 10 described below are realized by causing the processor to execute a computer program stored in the storage device. The hydraulic actuator controller 10 may be formed by dedicated hardware.

The power controller 13 is an electronic control unit that controls driving torque and regenerative braking torque to be generated by the driving force source 14, and includes a processor and peripheral components such as a storage device. The power controller 13 may be formed by dedicated hardware. The power controller 13 controls the regenerative braking torque and driving torque to be generated by the driving force source 14 on the basis of the regenerative braking torque command value and the acceleration torque command signal output from the driving force controller 5.

Note that the driving force controller 5, the booster controller 9, the hydraulic actuator controller 10, and the power controller 13 may respectively be separate controllers, or any or all of these controllers may be integrated into the same controller.

Next, control of braking force and driving force by the driving force controller 5 is described. The driving force controller 5 generates acceleration in the vehicle when the accelerator stroke amount Sa is larger than a predetermined first threshold value Sa1, and generates deceleration in the vehicle when the accelerator stroke amount Sa is smaller than a second threshold value Sa2 set to a value smaller than or equal to the first threshold value Sa1. Such control of braking force and driving force according to the accelerator stroke amount Sa may be referred to as "one-pedal control" in the following description.

Although the present specification describes an example in which the second threshold value Sa2 is set to the same value as the first threshold value Sa1 (i.e., when the accelerator stroke amount Sa is smaller than the first threshold value Sa1, deceleration is generated in the vehicle), the second threshold value Sa2 may be set to a value smaller than the first threshold value Sa1.

Figure 3A:
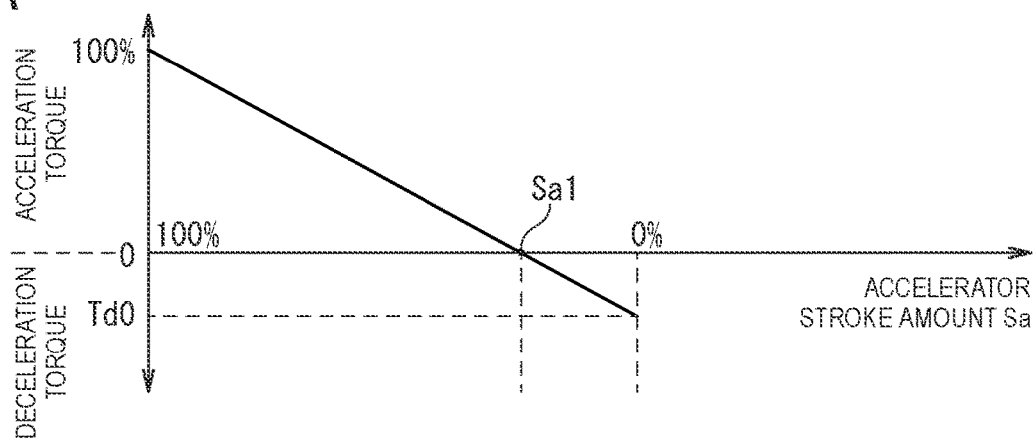
FIG. 3A is an illustrative diagram of a relationship between accelerator stroke amount and acceleration torque and deceleration torque.

FIG. 3A is an illustrative diagram of a relationship between the accelerator stroke amount Sa and the required acceleration torque and required deceleration torque calculated by the driving force controller 5. When the accelerator stroke amount Sa is at its maximum value (100%), the required acceleration torque is at its maximum value (100%). The smaller the accelerator stroke amount Sa becomes, the smaller the required acceleration torque becomes, and when the accelerator stroke amount Sa reaches the first threshold value Sa1, the required acceleration torque becomes 0. The first threshold value Sa1 may be, for example, one fourth (25%) of the maximum value of the accelerator stroke amount Sa.

When the accelerator stroke amount Sa becomes smaller than the first threshold value Sa1, the smaller the accelerator stroke amount Sa becomes, the larger the required deceleration torque becomes. When the accelerator stroke amount Sa reaches 0, the required deceleration torque becomes a predetermined value Td0. Hereinafter, the predetermined value Td0 may be referred to as "an accelerator-off deceleration torque Td0". The accelerator-off deceleration torque Td0 may be, for example, a deceleration torque that generates a deceleration of 0.2 G in the vehicle.

In such one-pedal control, when deceleration is generated in the vehicle when the accelerator stroke amount Sa is smaller than the first threshold value Sa1, the driver may feel discomfort when operating the brake pedal 16 after taking his or her foot off the accelerator pedal 15.

For example, when, at a time point where the driver shifts the foot from the accelerator pedal 15 to the brake pedal 16, further deceleration torque is generated according to the depressing operation of the brake pedal 16 from a state where the accelerator-off deceleration torque Td0 is generated and the brake stroke amount Sb is 0, a maximum deceleration torque is generated with a smaller brake stroke amount Sb than without one-pedal control. Therefore, the deceleration torque generated according to the brake stroke amount Sb differs depending on whether one-pedal control is performed or not, which may cause discomfort to the driver. Additionally, after the maximum deceleration torque is generated, the deceleration torque does not change even when the brake stroke amount Sb is increased, so that the driver may feel discomfort. Note that performing or not performing one-pedal control means, in addition to when one-pedal control is performed or not performed in the same vehicle, for example, when changing between a vehicle that does not perform one-pedal control and another vehicle that does perform one-pedal control.

In order to solve the problem, changing characteristics of the deceleration torque with respect to the brake stroke amount Sb can be considered so that the maximum deceleration torque is generated at the same brake stroke amount Sb whether one-pedal control is performed or not. However, even in this case, the driver may feel discomfort due to the changed characteristics of the deceleration torque with respect to the brake stroke amount Sb. Additionally, since the amount of regenerative braking torque generated is adjusted so that the maximum deceleration torque is generated at the same brake stroke amount Sb, the efficiency of regenerative energy recovery is reduced.

Therefore, when generating a deceleration torque according to the accelerator stroke amount Sa, the driving force controller 5 of the embodiment controls the brake stroke amount Sb of the brake pedal 16 according to the deceleration torque to be generated.

For example, the brake stroke amount Sb of the brake pedal 16 is controlled to be a stroke amount corresponding to a required deceleration torque calculated according to the accelerator stroke amount Sa. In other words, when the required deceleration torque according to the accelerator stroke amount Sa is defined as Tdr and a brake stroke amount required to generate the deceleration torque Tdr when one-pedal control is not performed is defined as Sbr, the brake stroke amount Sb of the brake pedal 16 is controlled to be Sbr.

In order to control the brake stroke amount Sb, for example, the driving force controller 5 may output a deceleration torque command signal indicating the required deceleration torque Tdr to the booster controller 9. The booster controller 9 controls the electric motor 7 so that the brake stroke amount Sb detected by the brake sensor 3 is the stroke amount Sbr corresponding to the required deceleration torque Tdr indicated by the deceleration torque command signal.

Figure 3B:
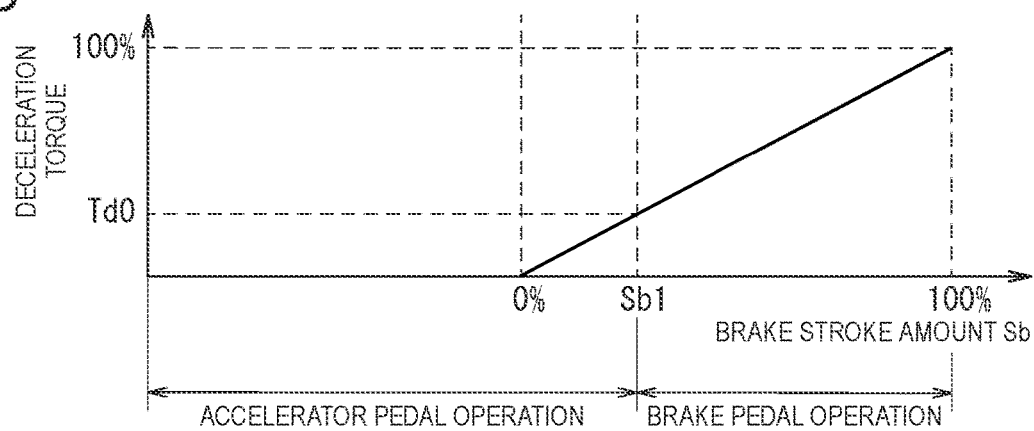
FIG. 3B is an illustrative diagram of a relationship between brake stroke amount and deceleration torque.
Figure 4A:
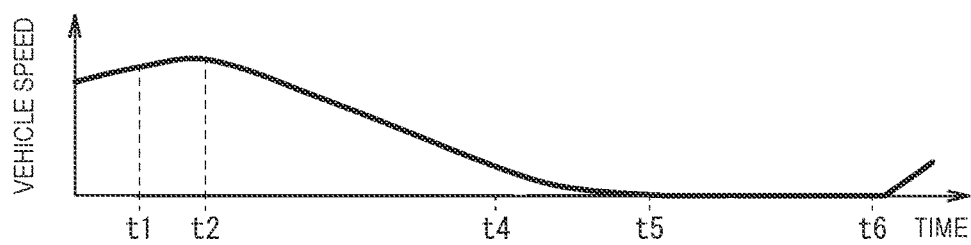
FIG. 4A is a time chart of an example of vehicle speed during one-pedal control.
Figure 4B:
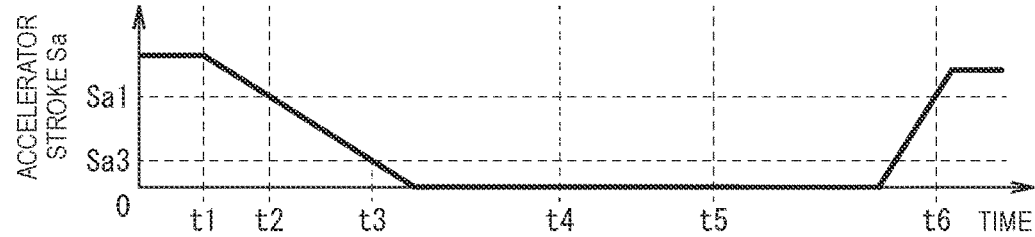
FIG. 4B is a time chart of an example of accelerator stroke amount during one-pedal control.
Figure 4C:
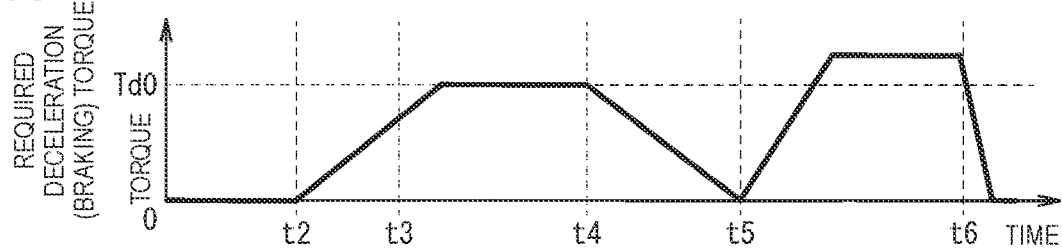
FIG. 4C is a time chart of an example of required deceleration torque during one-pedal control.
Figure 4D:
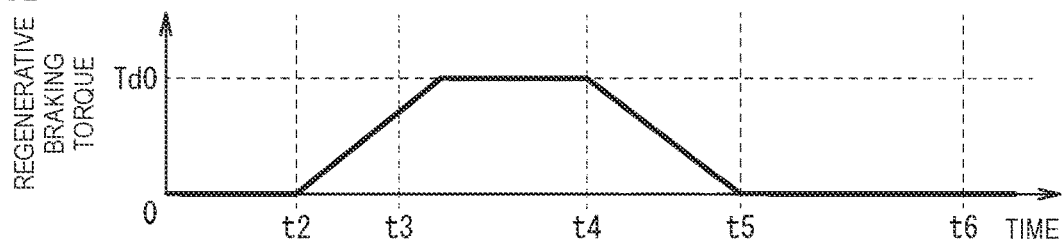
FIG. 4D is a time chart of an example of regenerative braking torque during one-pedal control.
Figure 4E:
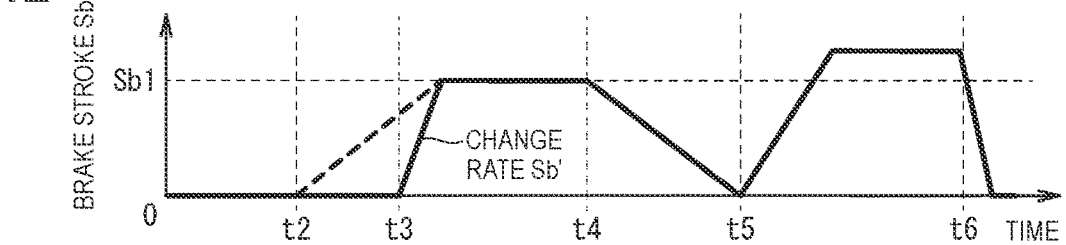
FIG. 4E is a time chart of an example of brake stroke amount during one-pedal control.
Figure 4F:
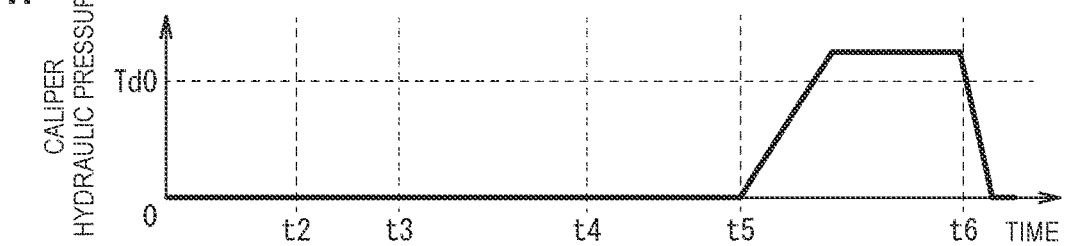
FIG. 4F is a time chart of an example of brake fluid pressure in brake calipers during one-pedal control.

FIG. 3B is an illustrative diagram of a relationship between the brake stroke amount Sb and wheel deceleration torque.

When the brake stroke amount Sb is 0, the deceleration torque is 0. As the brake stroke amount Sb increases, the deceleration torque increases, and when the brake stroke amount Sb is at its maximum value (100%), the deceleration torque is at its maximum value (100%).

A brake stroke amount Sb1 is the brake stroke amount Sb corresponding to the required deceleration torque (accelerator-off deceleration torque) Td0 when the accelerator stroke amount Sa is 0. For example, the brake stroke amount Sb1 may be 20% of the maximum value of the brake stroke amount Sb. The booster controller 9 drives the electric motor 7 to increase the brake stroke amount Sb from 0 to Sb1 while the required deceleration torque indicated by the deceleration torque command signal increase from 0 to Td0.

As described above, in the one-pedal control, when the accelerator stroke amount Sa changes from the maximum value (100%) to Sa1, the acceleration generated in the vehicle changes from the maximum value (100%) to 0. During this period, control of the brake stroke amount Sb by the electric motor 7 is not performed. When the accelerator stroke amount Sa changes from Sa1 to 0, the deceleration generated in the vehicle changes from 0 to the accelerator-off deceleration torque Td0, and the electric motor 7 increases the brake stroke amount Sb from 0 to Sb1.

After that, when the driver takes the foot off the accelerator pedal 15 and starts depressing operation of the brake pedal 16, the brake stroke amount Sb increases from Sb1. When the brake stroke amount Sb changes to the maximum value (100%), the deceleration torque changes to the maximum value (100%).

Thus, when the booster controller 9 increases the brake stroke amount Sb according to the required deceleration torque, the brake fluid flows out from the master cylinder 8. When brake fluid pressure in the brake calipers 12 is increased by the brake fluid, frictional braking torque is generated, and the required deceleration torque cannot be generated by regenerative braking.

Therefore, the driving force controller 5 outputs a frictional braking suppression command signal for suppressing the frictional braking torque to the hydraulic actuator controller 10 when generating the deceleration torque according to the accelerator stroke amount Sa.

When the hydraulic actuator controller 10 receives the frictional braking suppression command signal, the hydraulic actuator controller 10 causes the front wheel in-valve 22 to shut off the path to suppress the generation of frictional braking torque by the front wheel brake calipers 12FL and 12FR. Additionally, the hydraulic actuator controller 10 causes the rear wheel in-valve 21 and the rear wheel out-valve 23 to open the path and temporarily stores the brake fluid flowing out from the master cylinder 8 in the reservoir tank 27. This suppresses the generation of frictional braking torque by the rear wheel brake calipers 12RL and 12RR.

When the vehicle speed decreases and the regenerative braking torque that can be generated by the driving force source 14 becomes smaller than the required deceleration torque, regenerative cooperative control is performed to compensate for the lack of braking torque with frictional braking torque. In this case, the driving force controller 5 outputs a regenerative cooperation command signal to the hydraulic actuator controller 10. The regenerative cooperation command signal may include an information signal for an amount of insufficient braking toque (required deceleration torque—regenerative braking torque).

When the hydraulic actuator controller 10 receives the regenerative cooperation command signal, the hydraulic actuator controller 10 causes the rear wheel in-valve 21 and the front wheel in-valve 22 to open the path to allow the brake fluid to flow into the brake calipers 12 of the front and rear wheels. The hydraulic actuator controller 10 operates the hydraulic pump 20 to send the brake fluid in the reservoir tank 27 to the brake calipers 12 of the front and rear wheels, thereby generating frictional braking torque to compensate for the insufficient braking torque.

In this way, by allowing the brake fluid to escape into the reservoir tank 27, the generation of frictional braking torque can be suppressed even when the booster controller 9 controls the brake stroke amount Sb by one-pedal control. As a result, regenerative braking can be actively utilized to recover regenerative energy.

However, the reservoir tank 27 is provided with the pressurizer 27a that applies a predetermined pressure to the brake fluid inside the reservoir tank 27. This pressure is applied to the rear wheel brake calipers 12RL and 12RR to generate frictional braking torque, although at a relatively small value. Therefore, the amount of regenerative energy that can be recovered is reduced.

Thus, the driving force controller 5 of the embodiment delays the control of the brake stroke amount Sb by the booster controller 9 to delay the generation of frictional braking torque.

When performing the one-pedal control, the driver places the foot on the accelerator pedal 15, and does not place the foot on the brake pedal 16 before taking the foot off the accelerator pedal 15. It is therefore allowable to delay the control of the brake stroke amount Sb by the booster controller 9 until just before the foot is taken off the accelerator pedal 15.

For example, the driving force controller 5 delays the output of the deceleration torque command signal to the booster controller 9 until the accelerator stroke amount Sa becomes smaller than a third threshold value Sa3 smaller than the first threshold value Sa1. In other words, when the accelerator stroke amount Sa is smaller than the third threshold value Sa3, the deceleration torque command signal is output to the booster controller 9, and when the accelerator stroke amount Sa is larger than or equal to the third threshold value Sa3, the deceleration torque command signal to the booster controller 9 is not output.

This can prevent frictional braking torque from being generated when the accelerator stroke amount Sa is within a range of smaller than the first threshold value Sa1 and larger than or equal to the third threshold value Sa3 in one-pedal control.

Note that when the second threshold value Sa2 is set to a value smaller than the first threshold value Sa1 as described above, the third threshold value Sa3 is set to a value smaller than the second threshold value Sa2.

FIGS. 4A to 4F, respectively, are time charts of an example of vehicle speed, the accelerator stroke amount Sa, required deceleration torque (required braking torque) by the driving force controller 5, regenerative braking torque, the brake stroke amount Sb, and brake fluid pressure in the brake calipers 12 during one-pedal control.

At time point t1, the accelerator stroke amount Sa starts to decrease. When the accelerator stroke amount Sa reaches the first threshold value Sa1 at time point t2, the required acceleration torque calculated by the driving force controller 5 decreases to 0, and acceleration of the vehicle stops. The required deceleration torque at that time is 0.

After that, when the accelerator stroke amount Sa becomes smaller than the first threshold value Sa1, the driving force controller 5 calculates a required deceleration torque larger than 0. The driving force controller 5 outputs a regenerative braking torque command value to the power controller 13 to cause the driving force source 14 to generate a regenerative braking torque equal to the required deceleration torque, and outputs a frictional braking suppression command signal to the hydraulic actuator controller 10.

At time point t3, the accelerator stroke amount Sa reaches the third threshold value Sa3. A solid line in FIG. 4E indicates the brake stroke amount Sb when the control is delayed until the accelerator stroke amount Sa becomes smaller than the third threshold value Sa3, and a broken line in FIG. 4E indicates the brake stroke amount Sb when the control is not delayed.

When the control of the brake stroke amount Sb is not delayed (the broken line in FIG. 4E), the driving force controller 5 starts the control of the brake stroke amount Sb at time point t2. At this time, the frictional braking suppression command signal causes the brake fluid to flow into the reservoir tank 27, which therefore suppresses increased brake fluid pressure in the brake calipers 12, but frictional braking torque is generated by action of the pressurizer 27a of the reservoir tank 27d.

When the control of the brake stroke amount Sb is delayed (the solid line in FIG. 4E), the driving force controller 5 starts the control of the brake stroke amount Sb at time point t3, and increases to the stroke amount Sb1 at a change rate Sb'=dSb/dt. This can prevent the pressurizer 27a from generating frictional braking torque during a period from time point t2 to time point t3.

At time point t4, the driving force controller 5 gradually decreases the required deceleration torque as the vehicle speed decreases.

When the vehicle speed becomes 0 at time point t5, the driving force controller 5 generates a braking torque (stop holding torque) for maintaining the vehicle at a standstill. The driving force controller 5 outputs a frictional braking torque command value for generating the stop holding torque to the booster controller 9, and stops the frictional braking suppression command signal. The booster controller 9 drives the electric motor 7 of the booster 6 according to the frictional braking torque command value to generate the stop holding torque. This increases the brake stroke amount Sb.

After that, when the driver depresses the accelerator pedal 15 again, the driving force controller 5 stops the stop holding torque. Additionally, when the accelerator stroke amount Sa becomes larger than the first threshold value Sa1 at time point t6, a required acceleration torque larger than 0 is calculated. This causes the vehicle to restart.

Figure 5:
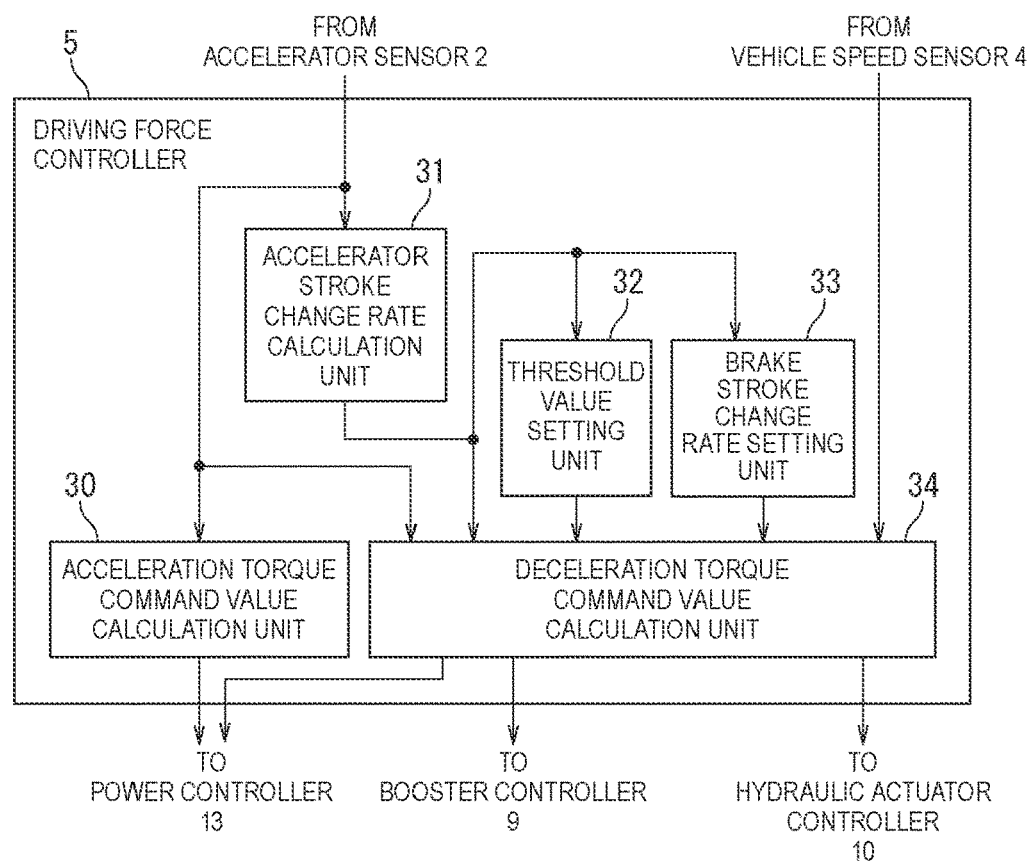
FIG. 5 is a block diagram of an example a functional configuration of a driving force controller.

Next, a functional configuration of the driving force controller 5 is described. Refer to FIG. 5. The driving force controller 5 includes an acceleration torque command value calculation unit 30, an accelerator stroke change rate calculation unit 31, a threshold value setting unit 32, a brake stroke change rate setting unit 33, and a deceleration torque command value calculation unit 34.

When the accelerator stroke amount Sa is larger than the first threshold value Sa1, the acceleration torque command value calculation unit 30 calculates a larger required acceleration torque as the accelerator stroke amount Sa is larger, and generates an acceleration torque command signal indicating the calculated required acceleration torque and outputs it to the power controller 13.

The accelerator stroke change rate calculation unit 31 calculates a change rate Sa'=dSa/dt of the accelerator stroke amount Sa. The accelerator stroke change rate calculation unit 31 outputs the calculated change rate Sa' to the threshold value setting unit 32, the brake stroke change rate setting unit 33, and the deceleration torque command value calculation unit 34.

The threshold value setting unit 32 sets the third threshold value Sa3 on the basis of the change rate Sa' when the accelerator stroke amount Sa decreases (i.e., a negative change rate Sa'). For example, the threshold value setting unit 32 may set a larger third threshold value Sa3 when an absolute value |Sa'| of the negative change rate Sa' is large (i.e., when the accelerator stroke amount Sa decreases quickly) than when the absolute value |Sa'| of the negative change rate is small, thereby reducing the amount of delay in the control of the brake stroke amount Sb. For example, the larger the absolute value |Sa'| of the negative change rate, the larger the third threshold value Sa3 may be set. The threshold value setting unit 32 outputs the calculated third threshold value Sa3 to the deceleration torque command value calculation unit 34.

The brake stroke change rate setting unit 33 sets the change rate Sb' of the brake stroke amount Sb when controlling the brake stroke amount Sb on the basis of the change rate Sa' when the accelerator stroke amount Sa decreases (i.e., the negative change rate Sa'). For example, the brake stroke change rate setting unit 33 may set a faster change rate Sb' when the absolute value |Sa'| of the negative change rate Sa' is large than when the absolute value |Sa'| of the negative change rate is small, thereby reducing the amount of delay in the control of the brake stroke amount Sb. For example, the larger the absolute value |Sa'| of the negative change rate, the faster the change rate Sb' may be set. The brake stroke change rate setting unit 33 outputs the calculated change rate Sb' to the deceleration torque command value calculation unit 34.

When the accelerator stroke amount Sa is smaller than the first threshold value Sa1, the deceleration torque command value calculation unit 34 calculates a larger required deceleration torque as the accelerator stroke amount Sa is smaller.

The deceleration torque command value calculation unit 34 calculates a regenerative braking torque command value smaller than or equal to the required deceleration torque on the basis of a vehicle speed detected by the vehicle speed sensor 4. The deceleration torque command value calculation unit 34 calculates a larger regenerative braking torque command value when the vehicle speed is high than when the vehicle speed is low. For example, the higher the vehicle speed, the larger the regenerative braking torque command value is calculated.

For example, the deceleration torque command value calculation unit 34 may calculate a maximum regenerative braking torque that can be generated by the driving force source 14 according to vehicle speed, set the required deceleration torque to the regenerative braking torque command value when the maximum regenerative braking torque is larger than or equal to the required deceleration torque, and set the maximum regenerative braking torque to the regenerative braking torque command value when the maximum regenerative braking torque is smaller than the required deceleration torque. The deceleration torque command value calculation unit 34 outputs a deceleration torque command signal including the regenerative braking torque command value to the power controller 13.

Additionally, when the accelerator stroke amount Sa is smaller than the first threshold value Sa1, the deceleration torque command value calculation unit 34 outputs a frictional braking suppression command signal to the hydraulic actuator controller 10 in order to suppress the generation of frictional braking torque when generating regenerative braking torque.

When the accelerator stroke amount Sa becomes smaller than the third threshold value Sa3, the deceleration torque command value calculation unit 34 outputs a deceleration torque command signal including the frictional braking toque command value to the booster controller 9 to control the brake stroke amount Sb. The deceleration torque command value calculation unit 34 controls the frictional braking toque command value so that the brake stroke amount Sb increases at the change rate Sb' set by the brake stroke change rate setting unit 33, and increases the frictional braking torque command value to the required deceleration torque.

When the vehicle speed decreases and the regenerative braking torque that can be generated by the driving force source 14 becomes smaller than the required deceleration torque, regenerative cooperative control is performed to compensate for the lack of braking torque with frictional braking torque. In this case, the deceleration torque command value calculation unit 34 outputs a regenerative cooperation command signal to the hydraulic actuator controller 10.

When the vehicle speed becomes 0, the deceleration torque command value calculation unit 34 outputs a frictional braking torque command value for maintaining the vehicle at a standstill to the booster controller 9, and stops the output of the frictional braking suppression command signal.

Figure 6:
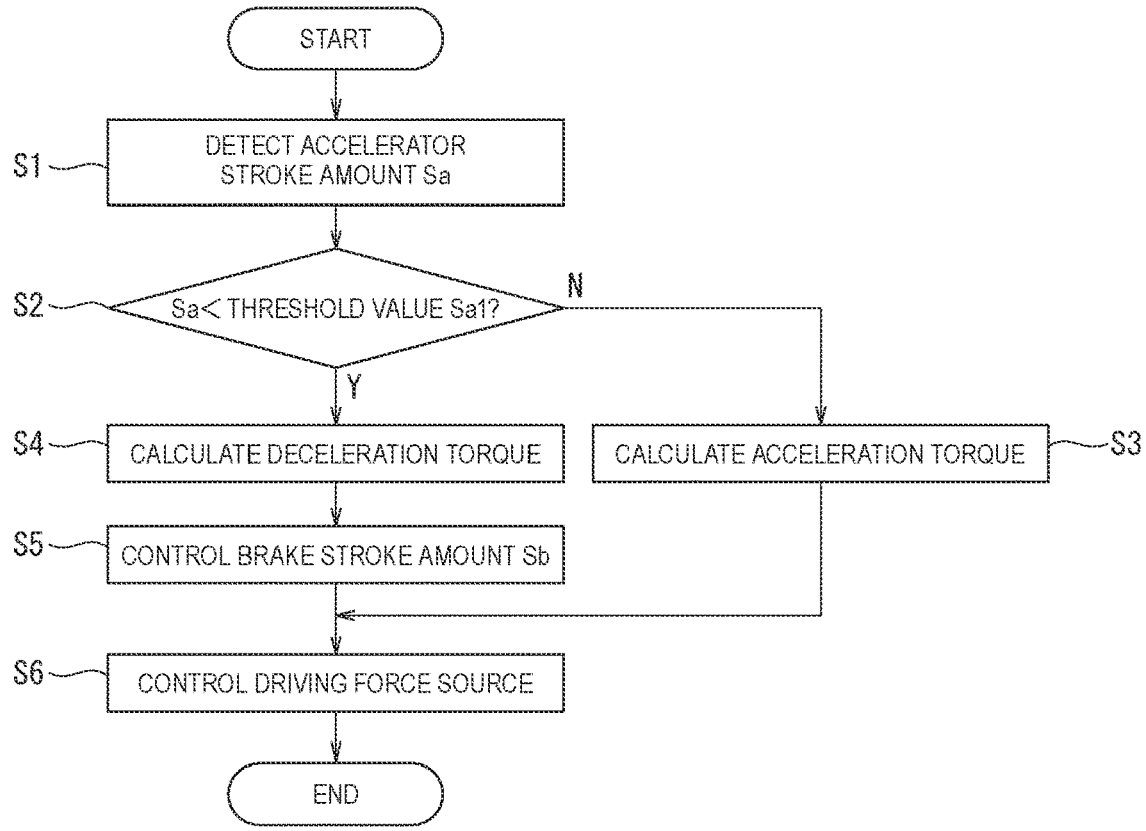
FIG. 6 is a flowchart of an example of a braking/driving force control method according to an embodiment.

FIG. 6 is a flowchart of an example of the braking/driving force control method of the embodiment.

At step S1, the accelerator sensor 2 detects the accelerator stroke amount Sa.

At step S2, the driving force controller 5 determines whether the accelerator stroke amount Sa is smaller than the first threshold value Sa1 or not. If the accelerator stroke amount Sa is larger than or equal to the first threshold value Sa1 (step S2: N), processing proceeds to step S3. If the accelerator stroke amount Sa is smaller than the first threshold value Sa1 (step S2: Y), processing proceeds to step S4. Note that as described above, the first threshold value Sa1 and the second threshold value Sa2 are set to the same value in the present embodiment. However, when a second threshold value Sa2 smaller than the first threshold value Sa1 is set, it is additionally determined whether or not the accelerator stroke amount Sa is smaller than the second threshold value Sa2 if the accelerator stroke amount Sa is smaller than the first threshold value Sa1 at step S2. If the accelerator stroke amount Sa is smaller than the second threshold value Sa2, processing proceeds to step S4, and if the accelerator stroke amount Sa is larger than or equal to the second threshold value Sa2, processing returns to step S2 again to compare the accelerator stroke amount Sa with the first threshold value Sa1.

At step S3, the driving force controller 5 calculates a larger required acceleration torque as the accelerator stroke amount Sa is larger. Then, processing proceeds to step S6.

At step S4, the driving force controller 5 calculates a larger required deceleration torque as the accelerator stroke amount Sa is smaller. Then, processing proceeds to step S5.

At step S5, the driving force controller 5 and the booster controller 9 control the brake stroke amount Sb according to the required deceleration torque. Then, processing proceeds to step S6.

At step S6, the driving force source 14 generates a driving torque or a regenerative braking torque, respectively, according to the required acceleration torque or the required deceleration torque.

Effects of Embodiment (1) The braking/driving force control device includes an accelerator pedal, a brake pedal, a vehicle driving force source, a braking device that generates a braking force on wheels according to depressing operation of the brake pedal by a driver, an accelerator sensor that detects an accelerator stroke amount that is a stroke amount of the accelerator pedal, and at least one controller that calculates a driving force to be generated by the vehicle driving force source when the accelerator stroke amount detected by the accelerator sensor is larger than a predetermined first stroke amount, that calculates a deceleration driving force to be generated by the vehicle driving force source when the accelerator stroke amount is smaller than a second stroke amount smaller than or equal to the first stroke amount, that controls the vehicle driving force source to generate the calculated driving force and deceleration driving force, and that controls a brake stroke amount that is a stroke amount of the brake pedal according to the calculated deceleration driving force.

This allows the driver's discomfort when operating the brake pedal to be reduced in the braking/driving force control device that generates driving force and deceleration driving force according to the operation amount of the accelerator pedal.

(2) The braking/driving force control device may include a vehicle speed sensor that detects a vehicle speed that is a traveling speed of the vehicle. When the accelerator stroke amount is smaller than the second stroke amount, the at least one controller may calculate a larger deceleration driving force when the vehicle speed is high than when the vehicle speed is low. As a result, when the vehicle speed is high, a larger regenerative braking force can be generated, and thus more regenerative energy can be recovered.

(3) The braking device may include a master cylinder that discharges an amount of brake fluid corresponding to the brake stroke amount, a brake caliper that is connected to the master cylinder via a hydraulic path and that generates a braking force corresponding to a hydraulic pressure in the hydraulic path, and a reservoir tank that is connected to the hydraulic path and that stores the brake fluid discharged from the master cylinder when the controller controls the brake stroke amount according to the calculated deceleration driving force. This allows efficient use of regenerative braking by suppressing the generation of frictional braking torque even when the brake stroke amount is controlled according to the deceleration driving force.

(4) The braking device may include a pressurizer that applies a predetermined pressure to the brake fluid inside the reservoir tank. This can suppress the brake fluid from remaining inside the reservoir tank.

(5) The at least one controller may control the brake stroke amount according to the deceleration driving force when the accelerator stroke amount is smaller than a third stroke amount smaller than the second stroke amount, and may not control the brake stroke amount according to the deceleration driving force when the accelerator stroke amount is larger than or equal to the third stroke amount. This allows efficient use of regenerative braking by suppressing the generation of frictional braking torque when the accelerator stroke amount is smaller than the second stroke amount and larger than or equal to the third stroke amount.

(6) The at least one controller may control the brake stroke amount according to the deceleration driving force when the accelerator stroke amount is smaller than the third stroke amount smaller than the second stroke amount or when a change rate of the accelerator stroke amount is larger than a threshold value, and may not control the brake stroke amount according to the deceleration driving force when the accelerator stroke amount is larger than or equal to the third stroke amount and the change rate is smaller than or equal to the threshold value. This can reduce delay in the control of the brake stroke amount when the change rate at which the accelerator stroke amount decreases is fast.

(7) The at least one controller may set a larger third stroke amount when the change rate of the accelerator stroke amount is large than when the change rate of the accelerator stroke amount is small. This can reduce delay in the control of the brake stroke amount when the change rate at which the accelerator stroke amount decreases is fast.

(8) The at least one controller may control regenerative braking force of an electric motor that is the vehicle driving force source to control the deceleration driving force. This allows the vehicle to decelerate using regenerative braking.

REFERENCE SIGNS LIST

1: Braking/driving force control device
6: Booster
7: Electric motor
8: Master cylinder
11: Hydraulic actuator
WFL, WFR, WRL, WRR: Wheel
12FR, 12FL, 12RR, 12RL: Brake caliper
15: Accelerator pedal
16: Brake pedal
20: Hydraulic pump
21: Rear wheel in-valve
22: Front wheel in-valve
23: Rear wheel out-valve
24: Front wheel out-valve
25: Cut valve
26: Suction valve
27: Reservoir tank
27a: Pressurizer
28: Damper

The invention claimed is:

1. A braking force control method and/or a driving force control method of a controller controlling a braking force and/or a driving force of a vehicle, the braking force control method and/or the driving force control method comprising causing the controller to:
   detect an accelerator stroke amount that is a stroke amount of an accelerator pedal;
   calculate a driving force that is generated by a vehicle driving force source when the accelerator stroke amount is larger than a predetermined first accelerator stroke amount, and calculate a braking force that is generated by the vehicle driving force source when the accelerator stroke amount is smaller than a predetermined second accelerator stroke amount smaller than or equal to the predetermined first accelerator stroke amount;
   control the vehicle driving force source to generate the calculated driving force and braking force;
   control a brake stroke amount that is a stroke amount of a brake pedal according to the calculated braking force while suppressing frictional braking torque that is generated due to the brake stroke amount being controlled according to the calculated braking force; and
   control a braking force of wheels according to depressing operation of the brake pedal by a driver.

2. The braking force control method and/or the driving force control method according to claim 1, comprising detecting a vehicle speed that is a traveling speed of the vehicle, wherein when the accelerator stroke amount is smaller than the predetermined second accelerator stroke amount, calculating the braking force to be greater when the vehicle speed is high than when the vehicle speed is low.

3. The braking force control method and/or the driving force control method according to claim 1, wherein when the accelerator stroke amount is smaller than a predetermined third acceleration stroke amount smaller than the predetermined second accelerator stroke amount, the brake stroke amount is controlled according to the braking force, and when the accelerator stroke amount is larger than or equal to the predetermined third acceleration stroke amount, the brake stroke amount is not controlled according to the braking force.

4. The braking force control method and/or the driving force control method according to claim 3, wherein the predetermined third accelerator stroke amount is set to a larger amount when a change rate of the accelerator stroke amount is large and is set to a smaller amount when the change rate of the accelerator stroke amount is small.

5. The braking force control method and/or the driving force control method according to claim 1, wherein when the accelerator stroke amount is smaller than a predetermined third accelerator stroke amount smaller than the predetermined second accelerator stroke amount or when a change rate of the accelerator stroke amount is larger than a threshold value, the brake stroke amount is controlled according to the braking force, and when the accelerator stroke amount is larger than or equal to the predetermined third accelerator stroke amount and the change rate is smaller than or equal to the threshold value, the brake stroke amount is not controlled according to the braking force.

6. The braking force control method and/or the driving force control method according to claim 1, wherein the braking force is controlled by controlling a regenerative braking force of an electric motor that is the vehicle driving force source.

7. A braking force control device and/or a driving force control device comprising:
   an accelerator pedal and a brake pedal;
   a vehicle driving force source;
   a braking device configured to generate a braking force on wheels according to a depressing operation of the brake pedal by a driver;
   an accelerator sensor configured to detect an accelerator stroke amount that is a stroke amount of the accelerator pedal; and
   at least one controller configured to calculate a driving force that is generated by the vehicle driving force source when the accelerator stroke amount detected by the accelerator sensor is larger than a predetermined first accelerator stroke amount, calculate a braking force that is generated by the vehicle driving force source when the accelerator stroke amount is smaller than a predetermined second accelerator stroke amount smaller than or equal to the predetermined first accelerator stroke amount, control the vehicle driving force source to generate the calculated driving force and braking force, and control a brake stroke amount that is a stroke amount of the brake pedal according to the calculated braking force while suppressing frictional braking torque that is generated due to the brake stroke amount being controlled according to the calculated braking force.

8. The braking force control device and/or the driving force control device according to claim 7, wherein the braking device includes:
   a master cylinder configured to discharge an amount of brake fluid corresponding to the brake stroke amount;
   a brake caliper connected to the master cylinder via a hydraulic path and configured to generate a braking force corresponding to a hydraulic pressure in the hydraulic path; and
   a reservoir tank connected to the hydraulic path and configured to store the brake fluid discharged from the master cylinder when the controller controls the brake stroke amount according to the calculated braking force.

9. The braking force control device and/or the driving force control device according to claim 8, wherein the braking device includes a pressurizer configured to apply a predetermined pressure to the brake fluid inside the reservoir tank.

10. The braking force control device and/or the driving force control device according to claim 7, wherein the at least one controller controls the brake stroke amount according to the braking force when the accelerator stroke amount is smaller than a predetermined third accelerator stroke amount smaller than the predetermined second accelerator stroke amount, and does not control the brake stroke amount according to the braking force when the accelerator stroke amount is larger than or equal to the predetermined third accelerator stroke amount.

11. The braking force control device and/or the driving force control device according to claim 10, wherein the at least one controller sets a larger third acceleration stroke amount when a change rate of the accelerator stroke amount is large than when the change rate of the accelerator stroke amount is small.

12. The braking force control device and/or the driving force control device according to claim 7, wherein the at least one controller controls the brake stroke amount according to the braking force when the accelerator stroke amount is smaller than a predetermined third accelerator stroke amount smaller than the predetermined second accelerator stroke amount or when a change rate of the accelerator stroke amount is larger than a threshold value, and does not control the brake stroke amount according to the braking force when the accelerator stroke amount is larger than or equal to the predetermined third accelerator stroke amount and the change rate is smaller than or equal to the threshold value.

* * * * *